Oct. 26, 1943.           J. F. ADEN            2,332,683
                        TOPPING KNIFE
                     Filed April 20, 1943
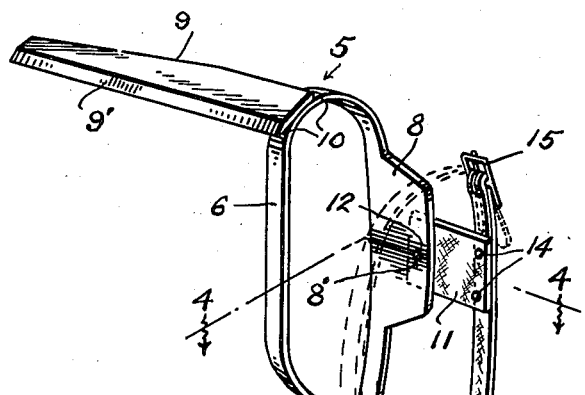
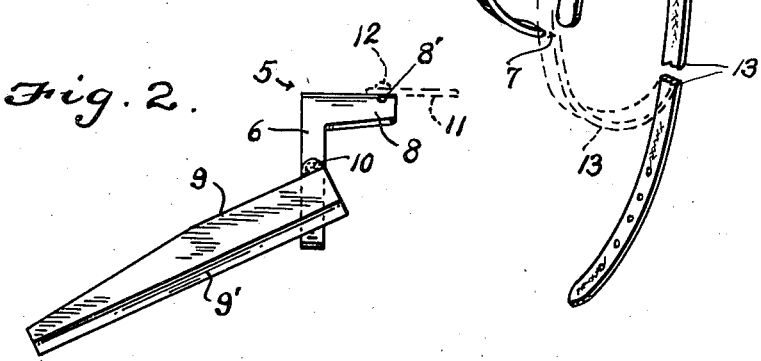
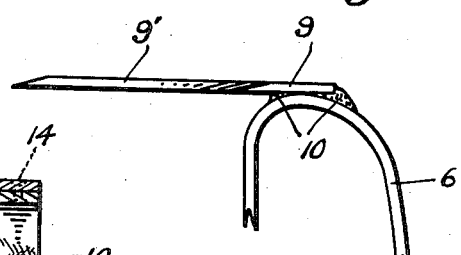
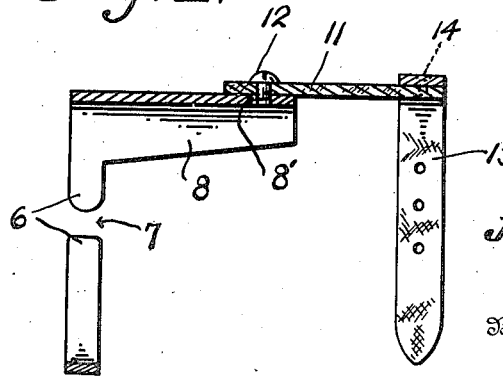
Inventor
J. Frank Aden
By L. B. James
Attorney Patented Oct. 26, 1943

2,332,683

UNITED STATES PATENT OFFICE 2,332,683

TOPPING KNIFE

John Frank Aden, Hazard, Nebr.

Application April 20, 1943, Serial No. 483,796

1 Claim. (Cl. 30—298)

This invention relates to agricultural implements and more particularly a topping knife.

The primary object of this invention resides in the provision of a hand supported topping knife adapted to speed up manual labor in cutting the seed tops off sargo, maize and other similar plants.

Another object of this invention resides in the provision of a topping knife adapted to permit cutting and gathering of the seed tops of sargo, maize and other similar plants with one hand of the operator thereof.

A further object of this invention resides in the particular disposition of the cutting blade relative to the hand encircling member or support therefor.

A still further object of this invention resides in the particular construction of the hand encircling support of the cutting blade.

Aside from the aforesaid objects one of the salient features of this invention resides in the particular construction of the strap and manner of connecting it to the hand encircling member.

With these and other objects in view, this invention resides in certain novel features of construction and arrangement of elements to be hereinafter more fully set forth in the specification, illustrated in the accompanying drawing and pointed out in the appended claim and, while this disclosure depicts my present conception of the invention, the right is reserved to resort to such changes in construction and arrangement of elements as come within the spirit of the invention.

In the accompanying drawing forming a part of this application;

Fig. 1 is a perspective view of the topping knife showing the strap thereof released in full lines and in wrist encircling position in dotted lines.

Fig. 2 is a detail plan view of the cutting blade and loop member supporting the same.

Fig. 3 is a rear view of the upper portion of the loop member with the cutting blade secured thereto.

Fig. 4 is an enlarged sectional view taken approximately on line 4—4 of Fig. 1.

In the present illustration of this invention the numeral 5 designates, in general, a topping knife consisting of a metal loop-shape hand encircling member 6 having one looped end open as indicated by the numeral 7. That portion of the member 6 which bears against the palm of the operator's hand is substantially straight while that portion thereof which bears against the back of his hand is of arcuate shape and is provided on its inner edge with a wide substantially triangular-shape plate 8 having a threaded aperture 8' therein to receive a screw 12. The screw 12 is adapted to pivotally fasten a wrist encircling strap 13 thereto through the instrumentality of a wide strap 11 securely connected to said strap 13 by rivets 14 or the like. Said strap 13 is provided with a suitable buckle 15 to adjustably secure the same around the wrist of the operator.

Rigidly secured to the looped end of the member 6, as indicated by the numeral 10, is a knife blade 9 having its cutting edge 9' disposed forwardly at an angle to the member 6.

With this topping knife constructed as aforesaid, operation thereof to the best advantage is obtained in fields of grain where the plants have grown to approximately 24 or 30 inches high, it being simply necessary for the operator while progressing through the field to continually thrust that hand only carrying the knife straight downwardly at his side or directly downwardly in front of himself to grasp the head of the grain to be cut, with a loose upwardly sliding hold below the grain, the upward pulling or sliding motion being against the roots of the plants causes the knife blade to shear the heads from the stems thereof. During this operation the head is in a neutral easy position in the operator's working hand with its top pointing upwardly toward him, therefore he can accumulate a certain number of cut heads in his working hand and still grasp new ones until his hand is entirely full of cut heads.

Where a number of heads are on the plants, they are somewhat bunched by a gathering motion of both hands and then severed from their stems as aforesaid and carried in both hands and even the arms.

In fields of tall grain the knife is still practical but requires use of both hands to gather or bunch the heads and cut them as heretofore set forth, one hand gathering the heads in position and supporting them for the cutting stroke by the knife carrying hand.

In the present disclosure of this invention the knife is constructed for use on the right hand, however, it is within the purview of this invention to rearrange the several elements to operate with equal success on the left hand.

With this invention fully set forth, it is manifest a topping knife is provided which will readily speed up the manual labor in harvesting heads of grain and the like and, through the particular disposition of the cutting blade relative to its support, positive cutting is assured with the minimum exertion on the part of the operator.

Having thus described my invention what I claim and desire to protect by Letters Patent is:

In a topping knife comprising, a loop-shape hand encircling member having one end open, a substantially triangular plate formed on one edge of the loop-shape member and having a threaded aperture therein adjacent its free end, a cutting blade secured on the closed end of said loop-shape member and disposed outwardly therefrom at an angle thereto, a wrist encircling strap, a wide strap secured to the wrist encircling strap and having an aperture in its opposite end, and a screw passing through the aperture in said wide strap and threadedly engaging the threaded aperture in said plate.

JOHN FRANK ADEN.